United States Patent
Cao et al.

(10) Patent No.: US 11,941,484 B2
(45) Date of Patent: Mar. 26, 2024

(54) GENERATING NON-CLASSICAL MEASUREMENTS ON DEVICES WITH PARAMETERIZED TIME EVOLUTION

(71) Applicant: Zapata Computing, Inc., Boston, MA (US)

(72) Inventors: Yudong Cao, Cambridge, MA (US); Christopher J Savoie, Nashville, TN (US)

(73) Assignee: Zapata Computing, Inc., Boston, MA (US)

( * ) Notice: Subject to any disclaimer, the term of this patent is extended or adjusted under 35 U.S.C. 154(b) by 275 days.

(21) Appl. No.: 17/394,200

(22) Filed: Aug. 4, 2021

(65) Prior Publication Data

US 2023/0042699 A1 Feb. 9, 2023

(51) Int. Cl.
*G06N 10/00* (2022.01)
*G06N 3/086* (2023.01)

(52) U.S. Cl.
CPC ............. *G06N 10/00* (2019.01); *G06N 3/086* (2013.01)

(58) Field of Classification Search
USPC ................ 716/100, 101, 102, 104, 105, 106
See application file for complete search history.

(56) References Cited

U.S. PATENT DOCUMENTS

| | | | |
|---|---|---|---|
| 10,469,087 B1 | 11/2019 | Granade et al. | |
| 10,755,191 B2 | 8/2020 | Shim et al. | |
| 11,106,993 B1 | 8/2021 | Dallaire-Demers et al. | |
| 11,537,928 B2 * | 12/2022 | Cao | G06N 5/01 |
| 11,562,284 B1 * | 1/2023 | Ryan | G06F 9/4843 |
| 2007/0239366 A1 | 10/2007 | Hilton | |

(Continued)

FOREIGN PATENT DOCUMENTS

| CA | 3151055 C | 8/2022 |
|---|---|---|
| CN | 110188885 A | 8/2019 |

(Continued)

OTHER PUBLICATIONS

Notice of Allowance dated May 18, 2022, in Canadian patent application No. 3,151,055, 1 page.

(Continued)

*Primary Examiner* — Brian Ngo
(74) *Attorney, Agent, or Firm* — Blueshift IP; Robert Plotkin

(57) ABSTRACT

A quantum contextual measurement is generated from a quantum device capable of performing continuous time evolution, by generating a first measurement result and a second measurement result and combining the first measurement result and the second measurement result to generate the quantum contextual measurement. The first measurement result may be generated by initializing the quantum device to a first initial quantum state, applying a first continuous time evolution to the first initial state to generate a first evolved state, and measuring the first evolved state to generate the first measurement result. A similar process may be applied to generate a second evolved state which is at least approximately equal to the first evolved state, and then applying another continuous time evolution to the second evolved state to generate a third evolved state, and measuring the third evolved state to generate the second measurement result.

24 Claims, 6 Drawing Sheets

(56) References Cited

U.S. PATENT DOCUMENTS

| | | |
|---|---|---|
| 2014/0187427 A1 | 7/2014 | Macready et al. |
| 2015/0032994 A1 | 1/2015 | Chudak et al. |
| 2015/0262072 A1 | 9/2015 | Stoltz |
| 2015/0317558 A1 | 11/2015 | Adachi |
| 2016/0328253 A1 | 11/2016 | Majumdar |
| 2017/0177751 A1 | 6/2017 | Macready et al. |
| 2017/0223094 A1 | 8/2017 | Johnson |
| 2017/0262765 A1 | 9/2017 | Bourassa |
| 2017/0351967 A1 | 12/2017 | Babbush et al. |
| 2018/0129965 A1 | 5/2018 | Bocharov et al. |
| 2018/0232652 A1 | 8/2018 | Curtis et al. |
| 2018/0330264 A1 | 11/2018 | Lanting et al. |
| 2019/0007051 A1 | 1/2019 | Sete et al. |
| 2019/0147359 A1 | 5/2019 | Chen et al. |
| 2019/0205783 A1 | 7/2019 | Nam et al. |
| 2019/0213495 A1 | 7/2019 | Babbush |
| 2019/0236476 A1 | 8/2019 | Pereverzev |
| 2020/0118025 A1 | 4/2020 | Romero et al. |
| 2020/0161529 A1 | 5/2020 | Chow et al. |
| 2020/0226487 A1 | 7/2020 | Radin et al. |
| 2020/0394537 A1 | 12/2020 | Wang et al. |
| 2020/0394549 A1 | 12/2020 | Dallaire-Demers et al. |
| 2021/0034998 A1 | 2/2021 | Cao et al. |
| 2021/0067146 A1* | 3/2021 | Cohen ................... G06N 10/00 |
| 2021/0073668 A1 | 3/2021 | Dallaire-Demers |
| 2021/0125096 A1 | 4/2021 | Puri et al. |
| 2021/0182726 A1 | 6/2021 | Harry Putra et al. |
| 2021/0272002 A1 | 9/2021 | Dallaire-Demers et al. |
| 2021/0365622 A1* | 11/2021 | Gonthier ............... G06N 10/00 |
| 2022/0292385 A1* | 9/2022 | Sauvage ............... G06N 10/60 |
| 2022/0335325 A1 | 10/2022 | Dallaire-Demers |

FOREIGN PATENT DOCUMENTS

| | | |
|---|---|---|
| EP | 4022530 A1 | 7/2022 |
| EP | 4026066 A1 | 7/2022 |
| EP | 4042338 A1 | 8/2022 |
| KR | 20120016381 A | 2/2012 |
| KR | 20160147988 A | 12/2016 |
| TW | 201945962 A | 12/2019 |
| WO | 2015069625 A1 | 5/2015 |
| WO | 2017027185 A1 | 2/2017 |
| WO | 2019050555 A1 | 3/2019 |
| WO | 2019126644 A1 | 6/2019 |
| WO | 2019150090 A1 | 8/2019 |
| WO | 2019152020 A1 | 8/2019 |
| WO | 2019209628 A1 | 10/2019 |
| WO | 2020146794 A1 | 7/2020 |
| WO | 2020252425 A1 | 12/2020 |
| WO | 2021022217 A1 | 2/2021 |
| WO | 2021046495 A1 | 3/2021 |
| WO | 2021062331 A1 | 4/2021 |
| WO | 2021102344 A1 | 5/2021 |

OTHER PUBLICATIONS

Andersen, C.K., et al, "Entanglement stabilization using ancilla-based parity detection and real-time feedback in superconducting circuits," npj Quantum Information, vol. 5, No. 1, pp. 1-7 pages, XP055810501, DOI: 10.1038/s41534-019-0185-4 (Dec. 1, 2019).

Baekkegaard, T., et al., "Realization of efficient quantum gates with a superconducting qubit-qutrit circuit," arXiv.org, Cornell University Library, 201 Olin Library Cornell University Ithaca, NY 14853, Feb. 12, 2018, 27 pages, XP081554230, DOI: 10.1038/s41598-019-49657-1.

Cade, C., et al., "Strategies for solving the Fermi-Hubbard model on near-term quantum computers", Phys. Rev. B, vol. 102, Iss. 23, pp. 1-27 (Nov. 30, 2020).

Dallaire-Demers, P., and Wilhelm, F.K., "A Method to efficiently simulate the thermodynamic properties of the Fermi-Hubbard model on a quantum computer", Phys. Rev. A, vol. 93, No. 3, pp. 1-19 (Nov. 27, 2015).

Extended European Search Report dated Dec. 22, 2022, in European patent application No. 20890215.5, 10 pages.

Extended European Search Report dated Oct. 27, 2022, in European patent application No. 20868114.8, 10 pages.

Mcardle, S., et al, "Quantum computational chemistry," arxiv.org, Cornell University Library, 201 Olin Library Cornell University Ithaca, NY 14853, pp. 1-59 XP081585393 (Aug. 30, 2018).

Non-Final Office Action dated Dec. 8, 2022 for U.S. Appl. No. 16/740,177, of Maxwell D. Radin, filed Jan. 10, 2020, 85 pages.

Anirban Narayan Chowdhury et al., "Improved implementation of reflection operators", researchgate.net, Mar. 6, 2018, 12 pages. Available online at https://www.researchgate.net/publication/323627065_Improved_implementation_of_reflection_operators.

Official Action dated Sep. 29, 2022, in Canadian patent application No. 3,157,270, 5 pages.

Extended European Search Report dated Sep. 20, 2022, in European patent application No. 20738886.9, 10 pages.

Colless, J.I., et al., "Robust determination of molecular spectra on a quantum processor," arxiv.org. Cornell University Library, 201 Olin Library Cornell University Ithaca, NY 14853, XP081278642, DOI: 10.1103/physrevx.8.011021, pp. 1-12 (Jul. 20, 2017).

M Mohseni et al., "Quantum Process Tomography: Resource Analysis of Different Strategies," arxiv.org, Cornell University Library, 201 Olin Library Cornell University Ithaca, NY 14853, Feb. 13, 2007, XP080275525, DOI: 10.1103/PHYSREVA.77.032322, 10 pages.

A. Shabani et al., "Efficient measurement of quantum dynamics via compressive sensing," arxiv.org, Cornell University Library, 201 Olin Library Cornell University Ithaca, NY 14853, Oct. 28, 2009, XP080374481, DOI: 10.1103/PHYSREVLETT.106.100401, 9 pages.

Alcazar, J., et al., "Quantum algorithm for credit valuation adjustments", Quantum Physics, arXiv:2105.12087, pp. 1-23 (May 25, 2021).

Andersen, C.K., et al., "Entanglement Stabilization using Parity Detection and Real-Time Feedback in Superconducting Circuits", arXiv:1902.06946v2, pp. 1-12 (Feb. 20, 2019).

Arute, F., et al., "Quantum supremacy using a programmable superconducting processor", Nature, vol. 574, pp. 505-510 (Oct. 23, 2019).

Baekkegaard, T., et al., "Realization of efficient quantum gates with a superconducting qubit-qutrit circuit", Scientific Reports, vol. 9, Article No. 13389, pp. 1-10 (Sep. 16, 2019).

Baker, J.M., et al., "Decomposing Quantum Generalized Toffoli with an Arbitrary Number of Ancilla", arXiv:1904.01671v1, pp. 1-10 (Apr. 2, 2019).

Balu, R., and Borle, A., "Bayesian Networks based Hybrid Quantum-Classical Machine Learning Approach to Elucidate Gene Regulatory Pathways", arXiv:1901.10557v1, pp. 1-9 (Jan. 23, 2019).

Bao, N., et al., "Universal Quantum Computation by Scattering in the Fermi-Hubbard model", arXiv:1409.3585v2, pp. 1-9 (Sep. 15, 2014).

Barenco, A., et al., "Elementary Gates for Quantum Computation", Physical review A, vol. 52, Issue No. 5, pp. 1-31 (Mar. 23, 1995).

Bedürftig, G., and Frahm, H., "Spectrum of boundary states in the open Hubbard chain", arXiv:cond-mat.9702227v1, pp. 1-14 (Feb. 26, 1997).

Bonet-Monroig, X., et al., "Nearly optimal measurement scheduling for partial tomography of quantum states", Quantum Physics, arXiv:1908.05628v2, pp. 1-9 (Sep. 6, 2019).

Bookatz, A. D., et al., "Error Suppression in Hamiltonian Based Quantum Computation Using Energy Penalties", arXiv:1407.1485v1, pp. 1-26 (Jul. 6, 2014).

Brassard, G., et al., "Quantum Amplitude Amplification and Estimation", arXiv:quant-ph/0005055v1, pp. 1-22 (May 15, 2000).

Bravyi, S., "Lagrangian Representation for Fermionic Linear Optics", arXiv:quant-ph/0404180v2, pp. 1-12 (Sep. 20, 2004).

Cao, Y., et al., "Implementation of a Toffoli gate using an array of coupled cavities in a single step", Scientific Reports, vol. 8, Article No. 5813, pp. 1-10 (Apr. 11, 2018).

Cao, Y., et al., "Quantum Chemistry in the Age of Quantum Computing", Quantum Physics, arXiv:1812.09976v2, pp. 1-194 (Dec. 28, 2018).

(56) References Cited

OTHER PUBLICATIONS

Chao, R., et al., "Overlapping qubits", Quantum Physics, arXiv:1701.01062v1, pp. 1-22 (Jan. 4, 2017).
Crawford, O., et al., "Efficient quantum measurement of Pauli operators in the presence of finite sampling error", Quantum Physics, arXiv:1908.06942v2, pp. 1-17 (Apr. 21, 2020).
Dallaire-Demers, P. L., et al., "An application benchmark for fermionic quantum simulations", arXiv:2003.01862v1, pp. 1-14 (Mar. 4, 2020).
Dallaire-Demers, P.L., and Killoran, N., "Quantum generative adversarial networks", arXiv:1804.08641v2, Phys. Rev. A, vol. 98, 012324, pp. 1-10 (Apr. 30, 2018).
Dallaire-Demers, P.L., et al., "Low-depth circuit ansatz for preparing correlated fermionic states on a quantum computer", Quantum Physics, arXiv:1801.01053v1 , pp. 1-15 (Jan. 3, 2018).
Essler, F. H. L., et al., "The one-dimensional Hubbard model", Cambridge University Press, pp. 1-753. (Dec. 11, 2003).
Esslinger, T., "Fermi-Hubbard physics with atoms in an optical lattice", arXiv:1007.0012v1, pp. 1-29 (Jun. 30, 2010).
Fedorov, A., et al., "Implementation of a Toffoli Gate with Superconducting Circuits", arXiv:1108.3966v1, pp. 1-5 (Aug. 19, 2011).
Ferrie, C., et al., "How to Best Sample a Periodic Probability Distribution, or on the Accuracy of Hamiltonian Finding Strategies", Quantum Information Processing, arXiv:1110.3067v1, pp. 1-8 (Oct. 13, 2011).
Figgat, C., et al., "Complete 3-Qubit Grover search on a programmable quantum computer", Nature Communications, vol. 8, Article No. 1918, pp. 1-9 (2017).
First Office Action dated May 14, 2021, in Taiwan patent application No. 109139876, 9 pages (English translation included).
Frerot, I., et al., "Detecting Many-Body Bell Non-Locality by Solving Ising Models", Phys. Rev. Lett. 126, 140504, Available online at <https://arxiv.org/pdf/2004.07796, pp. 1-14 (Apr. 10, 2021).
Ghamami, S., and Zhang, B., et al., "Efficient Monte Carlo Counterparty Credit Risk Pricing and Measurement", Journal of Credit Risk, vol. 10, No. 3, pp. 1-42 (Jul. 23, 2014).
Gokhale, P., and Chong, F.T., "O(N3) Measurement Cost for Variational Quantum Eigensolver on Molecular Hamiltonians", arXiv:1908.11857v1, pp. 1-5 (Aug. 30, 2019).
Gokhale, P., et al., "Minimizing state preparations in variational quantum eigensolver by partitioning into commuting families", Quantum Physics, arXiv:1907.13623v1, pp. 1-23 (Jul. 31, 2019).
Grover, L.K., "A fast quantum mechanical algorithm for database search", STOC '96: Proceedings of the twenty-eighth annual ACM symposium on Theory of Computing, pp. 1-8 (Jul. 1996).
Hoyer, P., et al., "On Arbitrary Phases in Quantum Amplitude Amplification", arXiv:quant-ph/0006031v1, pp. 1-6 (Jun. 7, 2000).
Huggins, W. J., et al., "Efficient and noise resilient measurements for quantum chemistry on near-term quantum computers", Quantum Physics, arXiv:1907.13117v3, pp. 1-10 (Sep. 23, 2019).
International Search Report & Written Opinion dated Dec. 11, 2020, in international patent application No. PCT/US2020/049605, 14 pages.
International Search Report & Written Opinion dated Jan. 5, 2021, in international patent application No. PCT/US2020/052958, 7 pages.
International Search Report & Written Opinion dated May 11, 2020, in International Patent Application No. PCT/US2020/013181, 11 pages.
International Search Report & Written Opinion dated Nov. 6, 2020, in international patent application No. PCT/US2020/044615, 8 pages.
International Search Report and Written Opinion for the international application No. PCT/US2021/035381, dated Sep. 27, 2021, 6 pages.
International Search Report and Written Opinion dated Mar. 15, 2021, in International Patent Application No. PCT/US2020/061631, 7 pages.
International Search Report and Written Opinion dated Sep. 21, 2020, in international patent application No. PCT/US2020/037655, pp. 1-8.
Izmaylov, A. F., et al., "Unitary Partitioning Approach to the Measurement Problem in the Variational Quantum Eigensolver Method", Quantum Physics, arXiv:1907.09040v2, pp. 1-7 (Oct. 18, 2019).
Johnson, P. D., et al., "Qvector: an algorithm for device-tailored quantum error correction", arXiv preprint arXiv:1711.02249v1, pp. 1-16 (Nov. 7, 2017).
Kandala, A., et al., "Hardware-efficient variational quantum eigensolver for small molecules and quantum magnets", Nature 549, pp. 1-24 (Oct. 13, 2017).
Kaushal, V., et al., "Shuttling-based trapped-ion quantum information processing", AVS Quantum Science, vol. 2, No. 1, pp. 1-25 (2020).
Kitaev, A.Y., "Quantum Measurements and the Abelian Stabilizer Problem", arXiv preprint quant-ph/9511026, pp. 1-22 (Nov. 20, 1995).
Kivlichan, I. D., et al., "Quantum Simulation of Electronic Structure with Linear Depth and Connectivity", Phys. Rev. Lett. 120, arXiv:1711.04789v2, pp. 1-6 (Mar. 13, 2018).
Kjaergaard, M., et al., "Superconducting Qubits: Current State of Play", arXiv:1905.13641v2, pp. 1-28 (Jul. 26, 2019).
Knill, E., et al., "Optimal Quantum Measurements of Expectation Values of Observables," Physical Review A, 7(1), , p. 012328, pp. 1-22 (Jul. 3, 2006).
Krantz, P., et al., "A Quantum Engineer's Guide to Superconducting Qubits", Applied Physics Reviews, vol. 6, No. 2, 021318, pp. 1-59 (2019).
Lee, S.J.R., et al., "Analytical Gradients for Projection-Based Wavefunction-in-DFT Embedding", arXiv:1903.05830v3, pp. 1-15 (Aug. 19, 2019).
Long, G.L., et al, "Phase Matching in Quantum Searching", arXiv:quant-ph/9906020v1, pp. 1-13 (Jun. 5, 1999).
Low, G.H., and Chuang, I.L., "Optimal Hamiltonian Simulation by Quantum Signal Processing", arXiv:1606.02685v2. pp. 1-6 (Dec. 20, 2016).
Low, G.H., et al., "Methodology of Resonant Equiangular Composite Quantum Gates", Physical Review X, vol. 6, No. 4, pp. 1-13 (2016).
Manby, F.R., et al., "A simple, exact density-functional-theory embedding scheme", Journal of Chemical Theory and Computation, 8 (8), pp. 2564-2568 (Jul. 17, 2012).
Maslov, D., "Basic Circuit Compilation Techniques for an Ion-Trap Quantum Machine", https://arxiv.org/pdf/1603.07678v4, pp. 1-18 (Feb. 21, 2017).
McClean, J. R., et al., "The theory of variational hybrid quantum-classical algorithms", New Journal of Physics, vol. 18, pp. 1-22 (Feb. 5, 2016).
Mølmer, K., and Sørensen, A., "Multiparticle entanglement of hot trapped ions", arXiv:quant-ph/9810040v2, pp. 1-4 (Jan. 26, 1999).
Motta, M., et al., "Low rank representations for quantum simulation of electronic structure", Computational Physics, Quantum Physics, arXiv:1808.02625v2, pp. 1-8 (Aug. 9, 2018).
Nielsen, M. A., and Chuang, I. L., "Quantum Computation and Quantum Information", Cambridge University Press, pp. 1-704 (2000).
Nielsen, M.A., et al., "Quantum Computation as Geometry", arXiv:quant-ph/0603161v2, pp. 1-13 (Mar. 21, 2006).
Notice of Allowance dated Jun. 28, 2021, for U.S. Appl. No. 17/033,727 of Pierre-Luc Dallaire-Demers, filed Sep. 26, 2020, 32 pages.
Peruzzo, A., et al., "A variational eigenvalue solver on a photonic quantum processor", Nature Communications, vol. 5, Article No. 4213, pp. 1-7 (2014).
Peruzzo, A., et al., "A variational eigenvalue solver on a quantum processor", Quantum Physics, arXiv:1304.3061v1, pp. 1-10 (Apr. 10, 2013).
Pino, J.M., et al., "Demonstration of the QCCD trapped-ion quantum computer architecture", arXiv:2003.01293, pp. 1-11 (Sep. 26, 2020).

(56) References Cited

OTHER PUBLICATIONS

Potthoff, M., "Chapter 1: Self-energy-functional theory", arXiv:1108.2183, pp. 1-38 (Aug. 10, 2011).
Rodriguez-Lujan, I., et al., "Quadratic Programming Feature Selection", The Journal of Machine Learning Research, vol. 11, pp. 1491-1516 (2010).
Romero, J., and Aspuru-Guzik, A., "Variational quantum generators: Generative adversarial quantum machine learning for continuous distributions", Quantum Physics, arXiv:1901.00848 [quant-ph], pp. 1-15 (Jan. 3, 2019).
Romero, J., et al., "Quantum autoencoders for efficient compression of quantum data", Quantum Science and Technology, vol. 2 (4):045001, Feb. 10, 2017, pp. 1-10.
Romero, J., et al., "Strategies for quantum computing molecular energies using the unitary coupled cluster ansatz", arXiv:1701.02691v2 [quant-ph], vol. 4, No. 4, pp. 1-18 (Feb. 10, 2018).
Rubin, N. C., et al., "Application of Fermionic Marginal Constraints to Hybrid Quantum Algorithms", New Journal of Physics, vol. 20, No. 5, 053020, pp. 1-21 (2018).
Schuch, N. and Verstraete, F., "Computational Complexity of interacting electrons and fundamental limitations of Density Functional Theory", Nature Physics, DOI: 10.1038/NPHYS1370, pp. 732-735 (Aug. 23, 2009).
Schuld, M., et al., "Circuit-centric quantum classifiers", arXiv:1804.00633v1, pp. 1-17 (Apr. 2, 2018).
Sepiol, M.A., "A High-Fidelity Microwave Driven Two-Qubit Quantum Logic Gate in 43Ca+", pp. 1-197 (2016).
Sergeevich, A., et al., "Characterization of a Qubit Hamiltonian Using Adaptive Measurements in a Fixed Basis", arXiv:1102.3700v2, pp. 1-6 (Nov. 23, 2011).
Verstraete, F., et al., "Quantum Circuits for Strongly Correlated Quantum Systems", arXiv:0804.1888v1, pp. 1-5 (Apr. 11, 2008).
Verteletskyi, V., et al., "Measurement optimization in the variational quantum eigensolver using a minimum clique cover", Quantum Physics, arXiv:1907.03358v4, pp. 1-7 (Mar. 26, 2020).
Wang, D., et al., "Accelerated Variational Quantum Eigensolver", arXiv:1802.00171v3, pp. 1-11 (Mar. 25, 2019).
Wang, G., et al., "Bayesian Inference with Engineered Likelihood Functions for Robust Amplitude Estimation", arXiv:2006.09350v2, pp. 1-62 (Jun. 26, 2020).
Wiebe, N., and Granade, C., "Efficient Bayesian Phase Estimation", arXiv:1508.00869v1, pp. 1-12 (Aug. 4, 2015).
Wiebe, N., et al., "Higher Order Decompositions of Ordered Operator Exponentials", Mathematical Physics, arXiv:0812.0562v3, pp. 1-16 (Dec. 4, 2008).
Zhao, A., et al., "Measurement reduction in variational quantum algorithms", Quantum Physics, arXiv:1908.08067v2, pp. 1-21 (Dec. 16, 2019).
International Search Report and Written Opinion issued in App. No. PCT/US2022/38142, dated Nov. 6, 2023, 8 pages.

\* cited by examiner

GENERATING NON-CLASSICAL MEASUREMENTS ON DEVICES WITH PARAMETERIZED TIME EVOLUTION

BACKGROUND

The ability for quantum computers to generate non-classical states is, by definition, necessary to create quantum advantage. Because of engineering constraints limiting the hardware of many of today's quantum computers, generating non-classical states on devices can be difficult. In many cases, it can be difficult to verify if the quantum device is even producing an output which is truly quantum.

Quantum contextuality is an information-theoretic resource which is necessary for the performance of quantum computers to outperform classical computers. The presence of quantum contextuality in a dataset, therefore, is an indicator of the generation of non-classical states. Since the advantage of quantum generative machine learning models depends on the ability to generate non-classical states, states which exhibit quantum contextuality are sufficient to exhibit such a property.

In particular, quantum annealers and other analog quantum computers which rely on time evolution, rather than quantum gates, have difficulty generating states which exhibit certifiable quantum contextuality. Gate model quantum computers, for instance, can often certify quantum contextuality merely by measuring an entangled state in various bases. However, devices which rely on time evolution may be limited in their ability to measure in other bases; for example, modern quantum annealers can only measure in the Z-basis, which precludes running quantum algorithms, such as VQE.

SUMMARY

A quantum contextual measurement is generated from a quantum device capable of performing continuous time evolution, by generating a first measurement result and a second measurement result and combining the first measurement result and the second measurement result to generate the quantum contextual measurement. The first measurement result may be generated by initializing the quantum device to a first initial quantum state, applying a first continuous time evolution to the first initial state to generate a first evolved state, and measuring the first evolved state to generate the first measurement result. A similar process may be applied to generate a second evolved state which is at least approximately equal to the first evolved state, and then applying another continuous time evolution to the second evolved state to generate a third evolved state, and measuring the third evolved state to generate the second measurement result.

DETAILED DESCRIPTION

Figure 1:
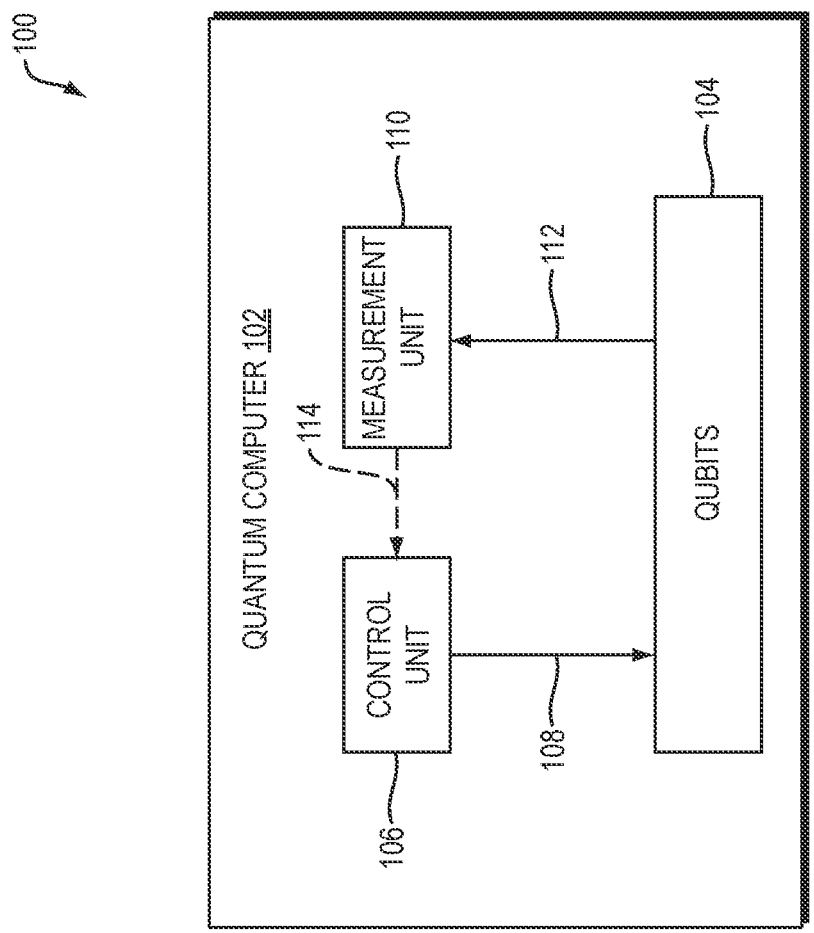
FIG. 1 is a diagram of a quantum computer according to one embodiment of the present invention.

Embodiments of the present invention are directed toward a method of generating measurements that exhibit quantum contextuality. Referring to FIG. 4, a flow diagram is shown of a method 400, implemented according to one embodiment of the present invention, for generating a non-classical measurement. The method 400 comprises initializing 406 a quantum device (which may, for example, be or include the quantum computer 102 of FIG. 1 or the hybrid quantum-classical computer 300 of FIG. 3) to create a first initial quantum state 408 $|\psi_0\rangle$. The method 400 further includes applying 410 a first continuous time evolution (also referred to as evolving under a Hamiltonian $H_1$) to the initial quantum state 408 $|\psi_0\rangle$ to create a first evolved state 412 $|\psi_1\rangle$. The method 400 further includes measuring 414 the first evolved state 412 $|\psi_1\rangle$ to generate a first measurement result $\vec{n}_1$ 416.

The method 400 again initializes 418 the quantum device to create a second initial quantum state 420. The method 400 time evolves 422 the second initial quantum state 420 to create a second evolved state 424 which is at least approximately equal to the first evolved state 412 $|\psi_1\rangle$.

The method applies 426 a third continuous time evolution (evolving under a second Hamiltonian $H_2$) to the second evolved state 424 to create a third evolved state 428 $|\psi_2\rangle$. The method 400 measures 430 the third evolved state 428 $|\psi_2\rangle$ to generate a second measurement result $\vec{n}_2$ 432. The method 400 combines 434 the two measurement results—for example, by concatenating the first measurement result 416 $\vec{n}_1$ with the second measurement result 432 $\vec{n}_2$—to form a complete measurement $\vec{m}$ 436.

Embodiments of the present invention may use any of a plurality of parameterized time evolutions and measurements, in any of a variety of combinations. For example, consider an n-qubit quantum system with a controllable and parameterized time-dependent evolution under a Hamiltonian H(t, x) where x is a set of parameters. Define the state of the system as $|\psi(t, x)\rangle$ for time t and parameter setting x. Embodiments of the present invention employ a measurement at a certain time $t_i$, and the information gained from each measurement is an n-bit string, denoted $\vec{n}_i$. One or more additional measurements at different times $t_i$ which, when combined, may form a sample of n·k=m bits, where k is the total number of measurements.

Figure 5:
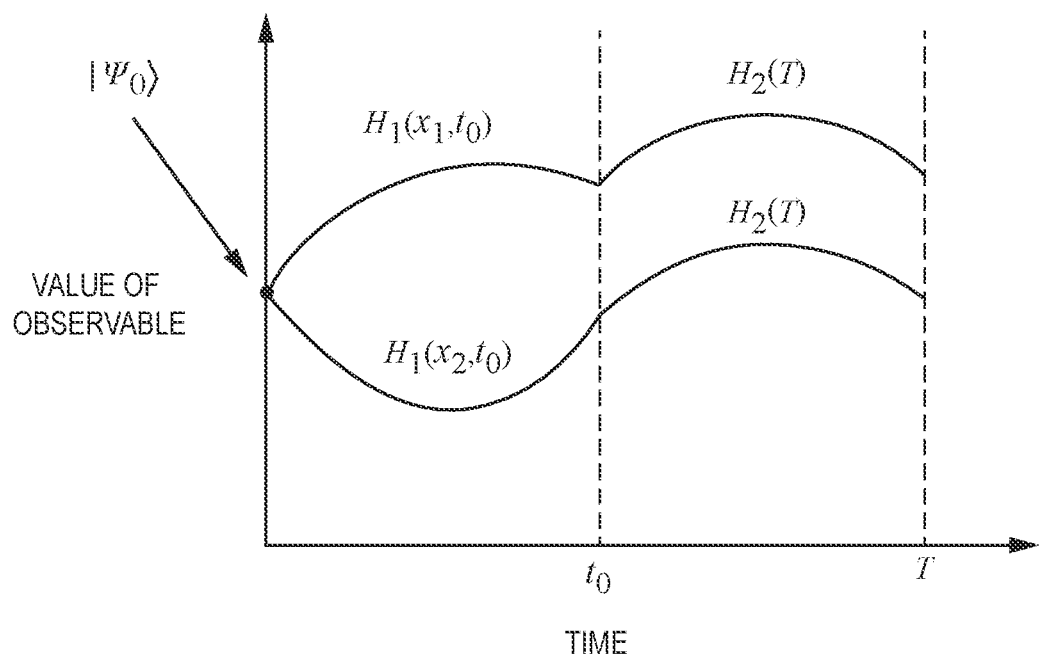
FIG. 5 illustrates the time evolution of an observable in two different parameter settings according to one embodiment of the present invention.

Embodiments of the present invention include systems and methods for using a plurality of measurements to perform variational optimization. In typical gate-model variational optimization schemes, measurements of an output quantum state are used as arguments for an objective function; the value of the objective function then provides feedback to an optimization routine which suggests new values for parameters of the model, i.e., parameters defining quantum gates generating the output quantum state. The process is repeated until the optimization route completes, wherein a maximum or minimum value of the objective function is identified. Similarly, embodiments of the present invention may use parameterized time evolution under a parameterized Hamiltonian H(t, x), where the resulting measurement $\vec{m}$ is used as an argument for the objective function and the parameter x is updated based on the optimization routine (see FIG. 5).

Embodiments of the present invention include utilizing the generated non-classical measurements as inputs for a quantum generator in machine learning models. For example, let H(t, x) be such that $H_1$(t, x) for time $0 \le t \le t_0$ for some $t_0$ and $H_2$(t) for time $t_0 \le t \le T$. Let $|\psi_1\rangle = |\psi(t_0, x)\rangle$ be the state at time $t_0$ and $|\psi_2\rangle = |\psi(T, x)\rangle$ be the state at time T. Since $H_2$ is independent of x, $|\psi_1\rangle$ and $|\psi_2\rangle$ differ by a unitary operation U that is independent of x. Suppose each of $|\psi_1\rangle$ and $|\psi_2\rangle$ are measured in the Z basis, generating a total of m=2 n bits. In the case where $UZ^{\otimes n}U^\dagger$ is not co-measurable with $Z^{\dagger n}$, the m-bit sample comes from a probability distribution that embodies quantum contextuality that does not have classical analogues. This capability can be useful for quantum-enhanced generative modeling where the samples derived from the quantum device act as latent space inputs that are mapping to a data space by a machine learning model such as neural networks. The variable x can be used as an adjustable parameter by the neural network to train the model; meanwhile, samples retain their property of quantum contextuality. It is believed that non-classical states are required for quantum generative models to provide a quantum advantage over classical generative models. Since quantum contextuality is a sufficient condition for the generation of non-classical states, embodiments of the present invention may outperform quantum generative learning models whose inputs do not possess (or cannot be certified to possess) quantum contextuality.

Advantages of embodiments of the present invention apply, for example, to quantum devices which utilize parameterized time evolution instead of quantum gates. This is particularly useful when the number of measurement bases in limited in the quantum device. Consider, for example, a quantum annealer which can measure only in the Z-basis and implements the Hamiltonian $H_1$(t, x). However, as earlier described, embodiments of the present invention can generate measurements described via a unitary rotation which, for particular choices of U, is equivalent to measuring the state in the implemented Hamiltonian $H_1$(t, x) in another basis (e.g. the X basis). Thus, embodiments of the present invention enable new measurements to be taken on quantum annealers without requiring modifications to the hardware. Embodiments of the present invention may also be utilized in devices other than quantum annealers. For example, quantum devices whose qubits manifest in neutral atoms (sometimes referred to as analog quantum computers or analog quantum simulators) also utilize parameterized time evolution.

Embodiments of the present invention include performing measurements in a plurality of bases. For example, embodiments of the present invention may repeat the preparation of state $|\psi_1\rangle$ and apply a continuous time evolution $H_j$(t) corresponding to appropriate basis-changing unitary $U_j$. All such resulting measurements $\vec{n}_j$ may then be combined to form $\vec{m}$.

Embodiments of the present invention include certifying the generated measurements as exhibiting quantum contextuality. The combination of a set of measurements, for example, may be certified by demonstrating the violation of a Bell inequality, e.g., by the method of [Frerot and Roscilde, https://arxiv.org/pdf/2004.07796.pdf (2021)] which is incorporated by reference herein.

One embodiment of the present invention is directed to a method for generating a quantum contextual measurement from a quantum device capable of performing continuous time evolution. The method includes: (A) generating a first measurement result, the generating comprising: (A) (1) initializing the quantum device to a first initial quantum state; (A) (2) applying, on the quantum device, a first continuous time evolution to the initial quantum state to generate a first evolved state; and (A) (3) measuring the first evolved state on the quantum device to generate the first measurement result; (B) generating a second measurement result, the generating comprising: (B) (1) initializing the quantum device to a second initial quantum state; (B) (2) applying, on the quantum device, a second continuous time evolution to the second initial quantum state to generate a second evolved state which is at least approximately equal to the first evolved state; (B) (3) applying, on the quantum device, a third continuous time evolution to the second evolved state to generate a third evolved state; and (B) (4) measuring the third evolved state on the quantum device to generate the second measurement result; and (C) combining the first measurement result and the second measurement result to generate the quantum contextual measurement. The second evolved state may be equal to the first evolved state.

At least one of the first continuous time evolution and the second continuous time evolution may be parameterized by a set of parameters. The method may further include: (D) providing an input into a generative neural network, wherein the input is a function of the quantum contextual measurement. The method may further include: (D) tuning the set of parameters, based on an objective function, to produce an updated set of parameters.

The second continuous time evolution may be chosen such that measuring the third evolved state is equivalent to a change of basis on measuring the first evolved state.

The second continuous time evolution may be equivalent to a change of basis on measuring the first evolved state.

The quantum device may comprise a quantum annealer.

The second initial quantum state may be at least approximately equal to the first initial quantum state. For example, the second initial quantum state may be equal to the first initial quantum state.

The second continuous time evolution may be at least approximately equal to the first continuous time evolution. For example, the second continuous time evolution may be equal to the first continuous time evolution.

The method may further include: (D) generating a plurality of additional measurement results, wherein the generation of each additional measurement results comprises: (D) (1) initializing the quantum device to an additional initial quantum state; (D) (2) applying, on the quantum device, a first additional continuous time evolution to the additional initial quantum state to generate a first additional evolved state which is at least approximately equal to the first evolved state; (D) (3) applying, on the quantum device, a second additional continuous time evolution to the first additional evolved state to generate a second additional evolved state; and (D) (4) measuring the second additional evolved state on the quantum device to generate the additional measurement result; and (E) combining the plurality of additional measurement results to the quantum contextual measurement to generate an expanded quantum contextual measurement.

Another embodiment of the present invention is directed to a hybrid quantum-classical computing system for generating a quantum contextual measurement from a quantum device capable of performing continuous time evolution. The hybrid quantum-classical computing system includes: the quantum device, comprising a plurality of qubits and a qubit controller that manipulates the plurality of qubits; and a classical computer including at least one processor and at least one non-transitory computer-readable medium, the at least one non-transitory computer-readable medium having computer program instructions stored thereon, the computer program instructions being executable by the at least one processor to cause the classical computer to cooperate with the quantum device to perform a method. The method includes: (A) generating a first measurement result, the generating comprising: (A) (1) initializing the quantum device to a first initial quantum state; (A) (2) applying, on the quantum device, a first continuous time evolution to the initial quantum state to generate a first evolved state; and (A) (3) measuring the first evolved state on the quantum device to generate the first measurement result; (B) generating a second measurement result, the generating comprising: (B) (1) initializing the quantum device to a second initial quantum state; (B) (2) applying, on the quantum device, a second continuous time evolution to the second initial quantum state to generate a second evolved state which is at least approximately equal to the first evolved state; (B) (3) applying, on the quantum device, a third continuous time evolution to the second evolved state to generate a third evolved state; and (B) (4) measuring the third evolved state on the quantum device to generate the second measurement result; and (C) combining the first measurement result and the second measurement result to generate the quantum contextual measurement. The second evolved state may be equal to the first evolved state.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to an d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled ε). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
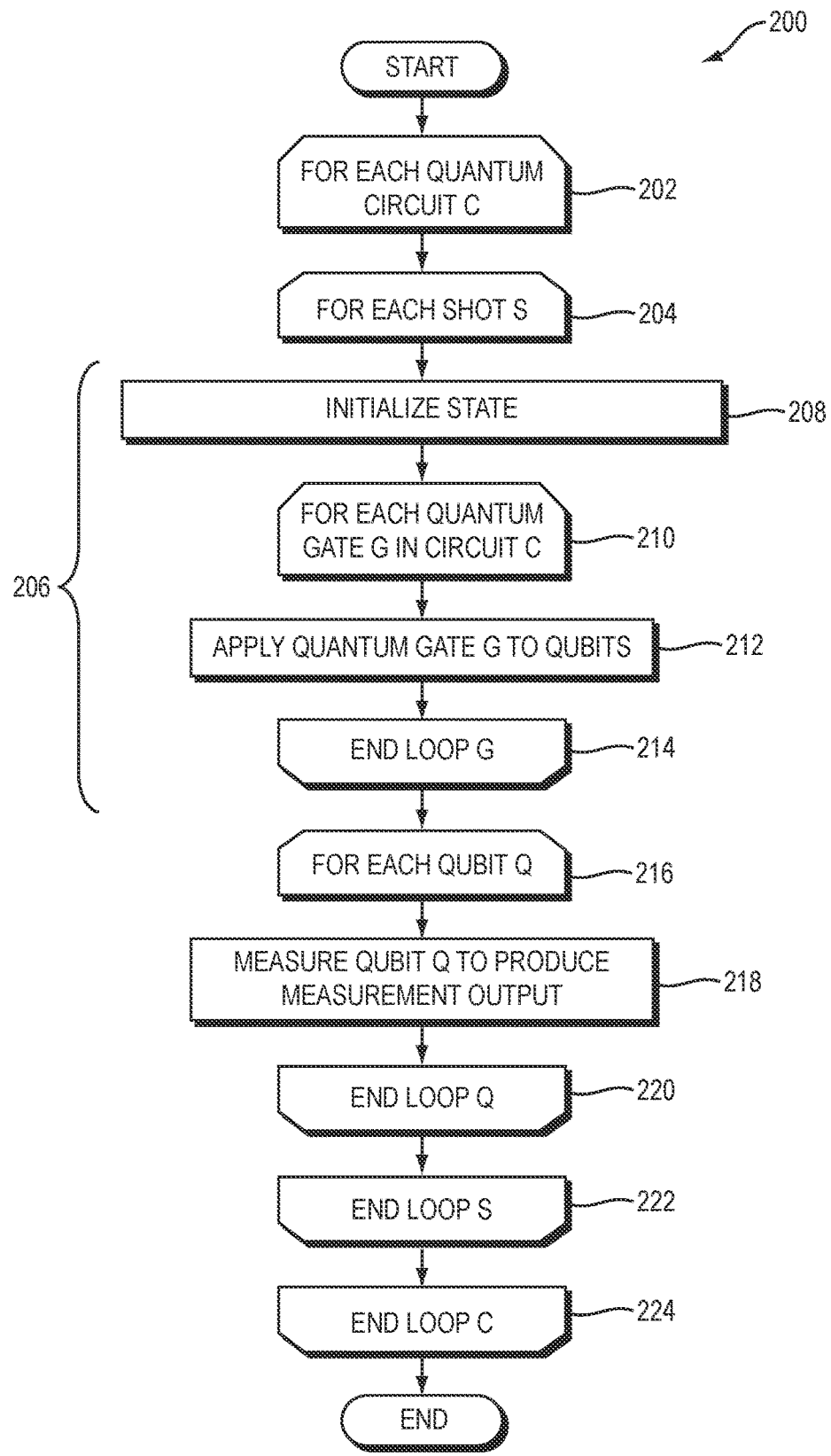
FIG. 2A is a flowchart of a method performed by the quantum computer of FIG. 1 according to one embodiment of the present invention.
Figure 2B:
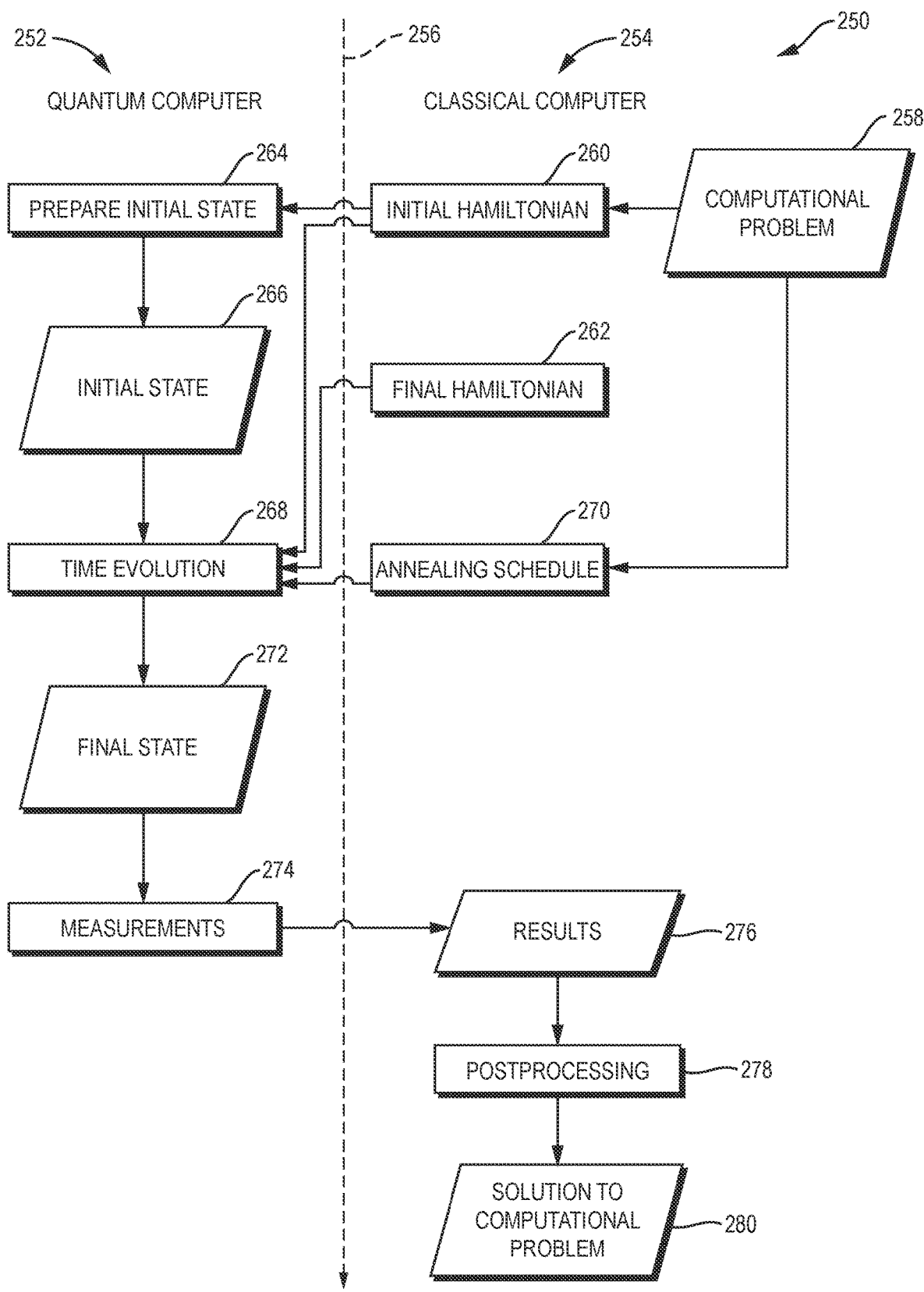
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original optimization problem. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For Example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback 114 from the measurement unit 110 to the control unit 106. Such feedback 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
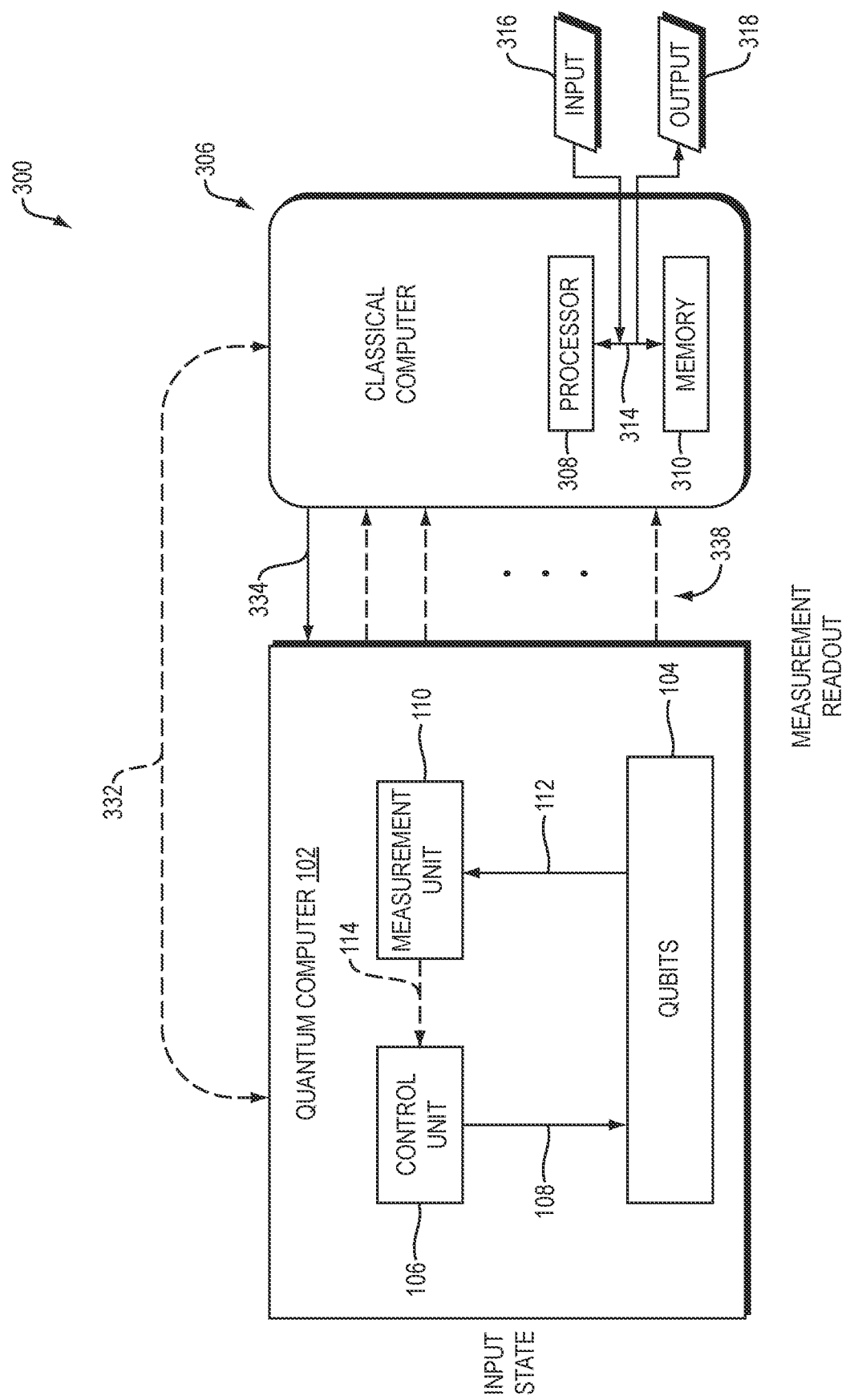
FIG. 3 is a diagram of a hybrid quantum-classical computer according to one embodiment of the present invention.
Figure 4:
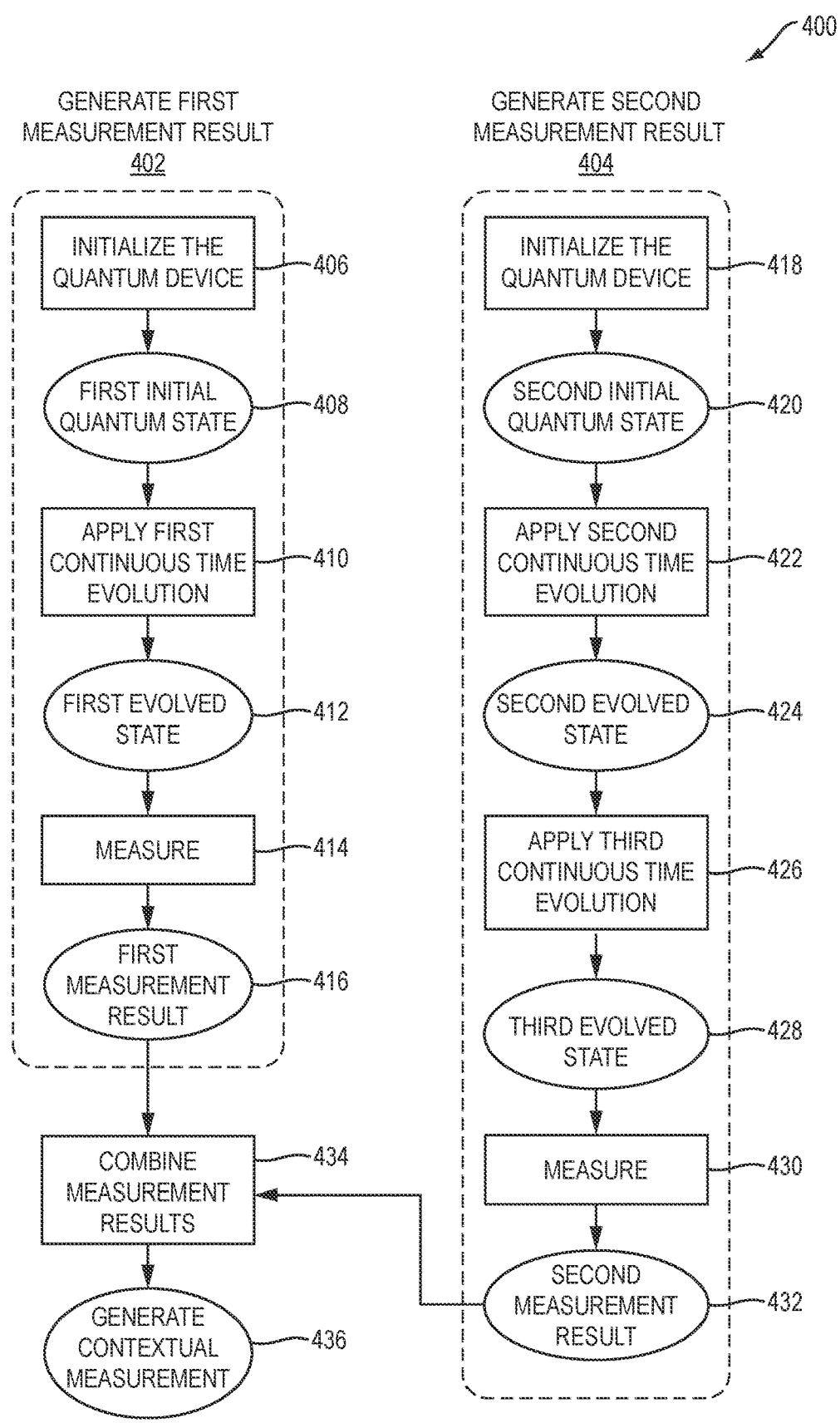
FIG. 4 is a flowchart of a hybrid quantum-classical computer (HQC) generating a non-classical measurement according to one embodiment of the present invention.

Referring to FIG. 3, a diagram is shown of a hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention manipulate qubits on a quantum computer, which cannot be performed mentally or manually by a human. More specifically, embodiments of the present invention apply a continuous time evolution (also referred to as evolving under a Hamiltonian $H_1$) to an initial quantum state to create an evolved quantum state, which cannot be performed mentally or manually by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A method for generating a quantum contextual measurement from a quantum device capable of performing continuous time evolution, the method comprising:
   (A) generating a first measurement result, the generating comprising:
      (A) (1) initializing the quantum device to a first initial quantum state;
      (A) (2) applying, on the quantum device, a first continuous time evolution to the initial quantum state to generate a first evolved state; and
      (A) (3) measuring the first evolved state on the quantum device to generate the first measurement result;
   (B) generating a second measurement result, the generating comprising:
      (B) (1) initializing the quantum device to a second initial quantum state;
      (B) (2) applying, on the quantum device, a second continuous time evolution to the second initial quantum state to generate a second evolved state which is at least approximately equal to the first evolved state;
      (B) (3) applying, on the quantum device, a third continuous time evolution to the second evolved state to generate a third evolved state; and
      (B) (4) measuring the third evolved state on the quantum device to generate the second measurement result; and
   (C) combining the first measurement result and the second measurement result to generate the quantum contextual measurement.

2. The method of claim 1, wherein at least one of the first continuous time evolution and the second continuous time evolution is parameterized by a set of parameters.

3. The method of claim 2, further comprising:
   (D) providing an input into a generative neural network, wherein the input is a function of the quantum contextual measurement.

4. The method of claim 2, further comprising:
   (D) tuning the set of parameters, based on an objective function, to produce an updated set of parameters.

5. The method of claim 4, wherein the second continuous time evolution is chosen such that measuring the third evolved state is equivalent to a change of basis on measuring the first evolved state.

6. The method of claim 4, wherein measuring the third evolved state is equivalent to a change of basis on measuring the first evolved state.

7. The method of claim 1, wherein the second continuous time evolution is chosen such that measuring the third evolved state is equivalent to a change of basis on measuring the first evolved state.

8. The method of claim 1, wherein measuring the third evolved state is equivalent to a change of basis on measuring the first evolved state.

9. The method of claim 1, wherein the quantum device comprises a quantum annealer.

10. The method of claim 1, wherein the second initial quantum state is at least approximately equal to the first initial quantum state.

11. The method of claim 10, wherein the second continuous time evolution is at least approximately equal to the first continuous time evolution.

12. The method of claim 1, further comprising:
(D) generating a plurality of additional measurement results wherein the generation of each additional measurement results comprises:
  (D) (1) initializing the quantum device to an additional initial quantum state;
  (D) (2) applying, on the quantum device, a first additional continuous time evolution to the additional initial quantum state to generate a first additional evolved state which is at least approximately equal to the first evolved state;
  (D) (3) applying, on the quantum device, a second additional continuous time evolution to the first additional evolved state to generate a second additional evolved state; and
  (D) (4) measuring the second additional evolved state on the quantum device to generate the additional measurement result; and
(E) combining the plurality of additional measurement results to the quantum contextual measurement to generate an expanded quantum contextual measurement.

13. A hybrid quantum-classical computing system for generating a quantum contextual measurement from a quantum device capable of performing continuous time evolution, the hybrid quantum-classical computing system including:
  the quantum device, comprising a plurality of qubits and a qubit controller that manipulates the plurality of qubits; and
  a classical computer including at least one processor and at least one non-transitory computer-readable medium, the at least one non-transitory computer-readable medium having computer program instructions stored thereon, the computer program instructions being executable by the at least one processor to cause the classical computer to cooperate with the quantum device to perform a method, the method comprising:
(A) generating a first measurement result, the generating comprising:
  (A) (1) initializing the quantum device to a first initial quantum state;
  (A) (2) applying, on the quantum device, a first continuous time evolution to the initial quantum state to generate a first evolved state; and
  (A) (3) measuring the first evolved state on the quantum device to generate the first measurement result;
(B) generating a second measurement result, the generating comprising:
  (B) (1) initializing the quantum device to a second initial quantum state;
  (B) (2) applying, on the quantum device, a second continuous time evolution to the second initial quantum state to generate a second evolved state which is at least approximately equal to the first evolved state;
  (B) (3) applying, on the quantum device, a third continuous time evolution to the second evolved state to generate a third evolved state; and
  (B) (4) measuring the third evolved state on the quantum device to generate the second measurement result; and
(C) combining the first measurement result and the second measurement result to generate the quantum contextual measurement.

14. The hybrid quantum-classical computing system of claim 13, wherein at least one of the first continuous time evolution and the second continuous time evolution is parameterized by a set of parameters.

15. The hybrid quantum-classical computing system of claim 14, wherein the method further comprises:
(D) providing an input into a generative neural network, wherein the input is a function of the quantum contextual measurement.

16. The hybrid quantum-classical computing system of claim 14, wherein the method further comprises:
(D) tuning the set of parameters, based on an objective function, to produce an updated set of parameters.

17. The hybrid quantum-classical computing system of claim 16, wherein the second continuous time evolution is chosen such that measuring the third evolved state is equivalent to a change of basis on measuring the first evolved state.

18. The hybrid quantum-classical computing system of claim 16, wherein measuring the third evolved state is equivalent to a change of basis on measuring the first evolved state.

19. The hybrid quantum-classical computing system of claim 13, wherein the second continuous time evolution is chosen such that measuring the third evolved state is equivalent to a change of basis on measuring the first evolved state.

20. The hybrid quantum-classical computing system of claim 13, wherein measuring the third evolved state is equivalent to a change of basis on measuring the first evolved state.

21. The hybrid quantum-classical computing system of claim 13, wherein the quantum device comprises a quantum annealer.

22. The hybrid quantum-classical computing system of claim 13, wherein the second initial quantum state is at least approximately equal to the first initial quantum state.

23. The hybrid quantum-classical computing system of claim 22, wherein the second continuous time evolution is at least approximately equal to the first continuous time evolution.

24. The hybrid quantum-classical computing system of claim 13, wherein the method further comprises:
(D) generating a plurality of additional measurement results wherein the generation of each additional measurement results comprises:
  (D) (1) initializing the quantum device to an additional initial quantum state;
  (D) (2) applying, on the quantum device, a first additional continuous time evolution to the additional initial quantum state to generate a first additional evolved state which is at least approximately equal to the first evolved state;
  (D) (3) applying, on the quantum device, a second additional continuous time evolution to the first additional evolved state to generate a second additional evolved state; and
  (D) (4) measuring the second additional evolved state on the quantum device to generate the additional measurement result; and
(E) combining the plurality of additional measurement results to the quantum contextual measurement to generate an expanded quantum contextual measurement.

* * * * *